US012743617B2

(12) United States Patent
Kumar et al.

(10) Patent No.: US 12,743,617 B2
(45) Date of Patent: Sep. 22, 2026

(54) SYSTEM AND METHOD FOR AUTOENCODER BASED MULTI-SENSOR FUSION

(71) Applicant: Tata Consultancy Services Limited, Mumbai (IN)

(72) Inventors: Kriti Kumar, Bangalore (IN); Mariswamy Girish Chandra, Bangalore (IN); Saurabh Sahu, Bangalore (IN); Arup Kumar Das, Bangalore (IN); Angshul Majumdar, Delhi (IN)

(73) Assignee: Tata Consultancy Services Limited, Mumbai (IN)

(*) Notice: Subject to any disclaimer, the term of this patent is extended or adjusted under 35 U.S.C. 154(b) by 1143 days.

(21) Appl. No.: 17/651,536

(22) Filed: Feb. 17, 2022

(65) Prior Publication Data

US 2022/0269940 A1 Aug. 25, 2022

(30) Foreign Application Priority Data

Feb. 17, 2021 (IN) ............................ 202121005902

(51) Int. Cl.
*G06N 3/045* (2023.01)
*G06F 18/25* (2023.01)
(Continued)

(52) U.S. Cl.
CPC ............... *G06N 3/08* (2013.01); *G06F 18/25* (2023.01); *G06N 3/045* (2023.01)

(58) Field of Classification Search
CPC ........... G06N 3/08; G06N 3/045; G06F 18/25
See application file for complete search history.

(56) References Cited

U.S. PATENT DOCUMENTS 10,065,652 B2 9/2018 Shenoy et al.
2018/0165554 A1 6/2018 Zhang et al.

FOREIGN PATENT DOCUMENTS

WO WO-2018046412 A1 * 3/2018 ............ G16H 50/20

OTHER PUBLICATIONS

Xing, Nan, Yang Liu, Hong Zhu, Jing Wang and Jungong Han, “Zero-Shot Learning via Discriminative Dual Semantic Auto-Encoder”, Dec. 2020, IEEE (Year: 2020).*

(Continued)

*Primary Examiner* — Usmaan Saeed
*Assistant Examiner* — Skylar K Vanwormer
(74) *Attorney, Agent, or Firm* — FINNEGAN, HENDERSON, FARABOW, GARRETT & DUNNER LLP

(57) ABSTRACT

Multi-sensor fusion is a technology which effectively utilizes the data from multiple sensors so as to portray a unified picture with improved information and offers significant advantages over existing single sensor-based techniques. This disclosure relates to a method and system for a multi-label classification using a two-stage autoencoder. Herein, the system employs autoencoder based architectures, where either raw sensor data or hand-crafted features extracted from each sensor are used to learn sensor-specific autoencoders. The corresponding latent representations from a plurality of sensors are combined to learn a fusing autoencoder. The latent representation of the fusing autoencoder is used to learn a label consistent classifier for multi-class classification. Further, a joint optimization technique is presented for learning the autoencoders and classifier weights together. Herein, the joint optimization allows discriminative features to be learnt from the plurality of sensors and hence it displays superior performance than the state-of-the-art methods with reduced complexity.

12 Claims, 8 Drawing Sheets

(51) Int. Cl.
*G06N 3/0455* (2023.01)
*G06N 3/08* (2023.01)
*G06N 3/084* (2023.01)
*G06N 3/088* (2023.01)
*G06N 3/09* (2023.01)

(56) References Cited

OTHER PUBLICATIONS

Nweke, Henry Friday et al., "Multi-sensor fusion based on multiple classifier systems for human activity identification", Human-centric Computing and Information Sciences, Date: Sep. 2019, Publisher: Springer, https://hois-journal.springeropen.com/track/pdf/10.1186/s13673-019-0194-5.pdf.

Jing, Luyang et al., "An Adaptive Multi-Sensor Data Fusion Method Based on Deep Convolutional Neural Networks for Fault Diagnosis of Planetary Gearbox", *Sensors*, Date: 2017, vol. 17, Issue: 2, Publisher: MDPI, https://www.mdpi.com/1424-8220/17/2/414.

Xing, Nan et al., "Zero-Shot Learning via Discriminative Dual Semantic Auto-Encoder", IEEE Access, Date: Dec. 2020, vol. 9, pp. 733-742, Publisher: IEEE, https://ieeexplore.ieee.org/stamp/stamp.jsp?tp=&arnumber=9303397.

* cited by examiner (b) Accuracy versus λ plot (a) Convergence of loss function

SYSTEM AND METHOD FOR AUTOENCODER BASED MULTI-SENSOR FUSION

CROSS-REFERENCE TO RELATED APPLICATIONS AND PRIORITY

This U.S. patent application claims priority under 35 U.S.C. § 119 to Indian provisional patent application number 202121005902, filed on Feb. 17, 2021. The entire contents of the aforementioned application are incorporated herein by reference.

TECHNICAL FIELD

The disclosure herein generally relates to a field of multi-sensor fusion, more particularly, to a system and method for multi-sensor fusion using a discriminative autoencoder learning.

BACKGROUND

Existing techniques employed for monitoring the performance of a system are usually based on the use of a single sensor which acts as the key performance indicator (KPI). Single sensor-based systems are not efficient as there is always uncertainty associated with the use of the single sensor for inference making. With multiple sensors available, combining the complementary, competitive, or cooperative information available from individual sensors results in more robust and accurate inferencing. Multi-sensor fusion is a technology which effectively utilizes the data from multiple sensors so as to portray a unified picture with improved information and offers significant advantages over existing single sensor-based techniques. This technology is capable of addressing various challenges related to data imperfection, data dimensionality, conflicting data etc. Since it deals with multiple sensors, it has been used in diverse fields such as remote sensing, industrial automation, wireless sensor networks, healthcare, natural language processing, etc.

Owing to the advantages of multi-sensor fusion, several advancements in multi-sensor fusion have taken place for improved inferencing or decision making. Depending on the nature of the problem and the available information from the sensors, various fusion architectures can be adopted. The current trend is based on using hand crafted features from the sensors for information fusion that largely depends on the application domain. Of late, owing to the increased complexity of the sensing environments and large amount of data being generated, processing such complex and voluminous data often exceeds human capability. Thereby, as opposed to hand crafted features design, learning representations directly from the data using representation learning techniques is getting a lot of attention. Generally, representation learning techniques form a part of a two-stage network where in the first stage, they are used to learn the representation from the sensor data and then in the second stage a classifier/regressor is learnt for inference making.

SUMMARY

Embodiments of the present disclosure present technological improvements as solutions to one or more of the above-mentioned technical problems recognized by the inventors in conventional systems.

In an aspect, there is provided a processor implemented method comprising the steps of receiving a signal information from a plurality of sensors ($X_1, X_2 \ldots X_n$) for training a sensor-specific autoencoder ($A_i$) (for i=1, . . . , n), and a fusing autoencoder ($A_f$) for a multi-label classification; extracting raw sensor data, and domain specific hand crafted features from the received signal information of the plurality of sensors ($X_1, X_2 \ldots X_n$), learning jointly, via the one or more hardware processors, the sensor-specific autoencoder ($A_i$), the fusing autoencoder ($A_f$), and weights (M) of a classifier utilizing a knowledge of output labels (Y) to enable discriminative features to be learnt from the signal information of each of the plurality of sensor ($X_1, X_2 \ldots X_n$); providing a test data for classifications; and classifying the test data using the learned sensor specific autoencoder ($A_i$), the fusing autoencoder ($A_f$) and the weights (M) of the classifier.

In another aspect, there is provided a system comprising: memory storing instructions; one or more communication interfaces; one or more hardware processors coupled to the memory via the one or more communication interfaces, wherein the one or more hardware processors are configured by the instructions to extract raw sensor data, and domain specific hand crafted features from the received signal information of the plurality of sensors ($X_1, X_2 \ldots X_n$); learn jointly the sensor-specific autoencoder ($A_i$), the fusing autoencoder ($A_f$), and the weights (M) of a classifier utilizing a knowledge of output labels (Y) to enable discriminative features to be learnt from the signal information of each of the plurality of sensor signals ($X_1, X_2 \ldots X_n$); provide test data for classifications; and classify the test data using the learned sensor specific autoencoder (AO, the fusing autoencoder ($A_f$) and the weights (M) of the classifier.

In yet another aspect, there is provided a computer program product comprising a non-transitory computer readable medium having a computer readable program embodied therein, wherein the computer readable program, when executed on a computing device, causes the computing device to receive a signal information from a plurality of sensors ($X_1, X_2 \ldots X_n$) for training a sensor-specific autoencoder ($A_i$) (for i=1, . . . , n), and a fusing autoencoder ($A_f$) for a multi-label classification; extract raw sensor data, and domain specific hand crafted features from the received signal information of the plurality of sensors ($X_1, X_2 \ldots X_n$) learn jointly the sensor-specific autoencoder (AO, the fusing autoencoder ($A_f$), and the weights (M) of a classifier utilizing a knowledge of output labels (Y) to enable discriminative features to be learnt from the signal information of each of the plurality of sensor signals ($X_1, X_2 \ldots X_n$) provide test data for classifications; and classify the test data using the learned sensor specific autoencoder ($A_i$), the fusing autoencoder ($A_f$) and the weights (M) of the classifier.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
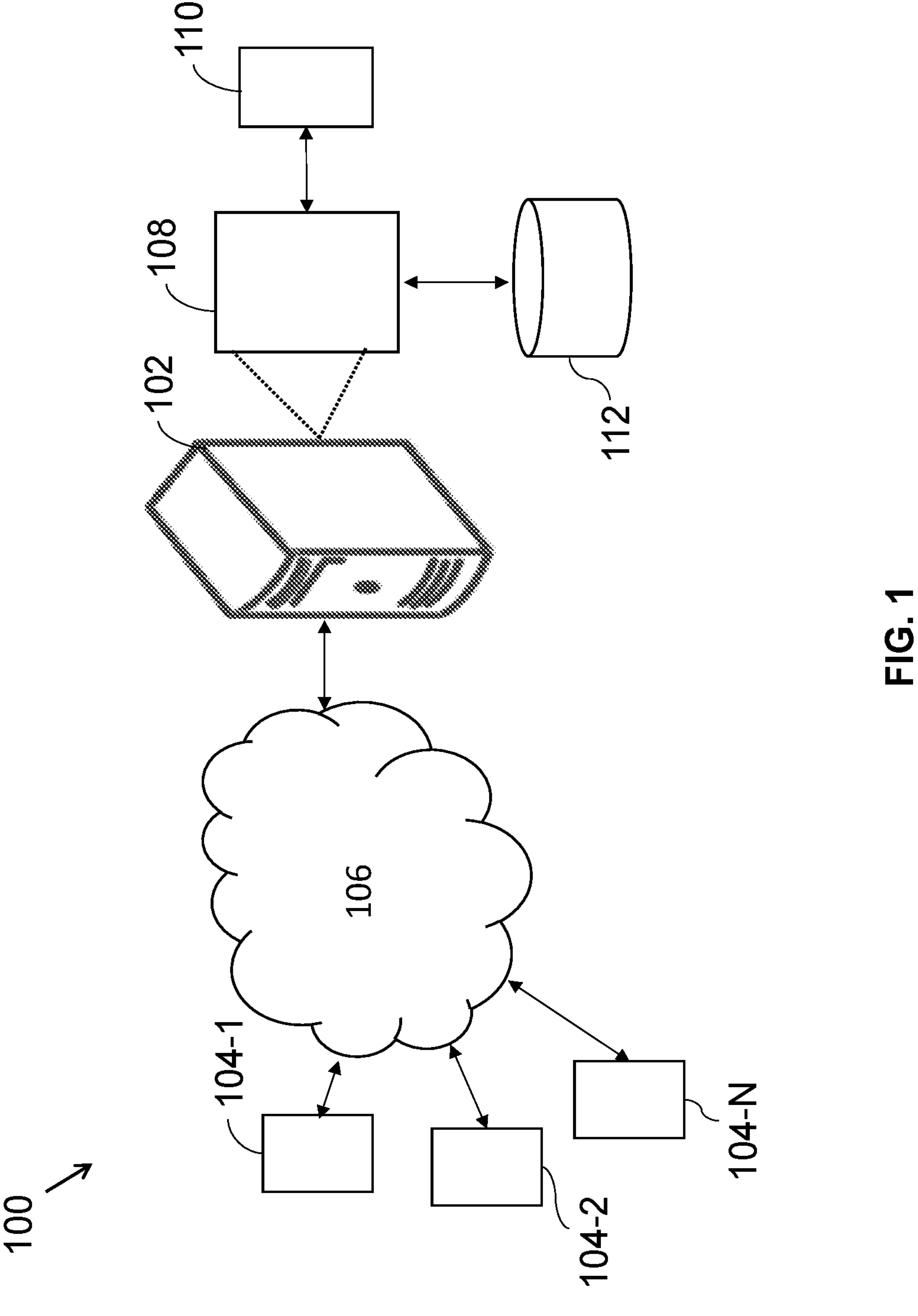
FIG. 1 illustrates a system for auto-encoder based multi-sensor fusion, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope being indicated by the following embodiments described herein.

The embodiments herein provide a system and method for autoencoder based multi-sensor fusion. Herein, the system employs autoencoder based architectures, where either raw sensor data or hand-crafted features extracted from each sensor are used to learn sensor-specific autoencoders. The corresponding latent representations from a plurality of sensors are combined to learn a fusing autoencoder. The latent representation of the fusing autoencoder is used to learn a label consistent classifier for multi-class classification. Further, a joint optimization technique is presented for learning the autoencoders and classifier weights together. Herein, the joint optimization allows discriminative features to be learnt from the plurality of sensors and hence it displays superior performance than the state-of-the-art methods with reduced complexity.

Referring now to the drawings, and more particularly to FIG. 1 through FIG. 8, where similar reference characters denote corresponding features consistently throughout the figures, there are shown preferred embodiments and these embodiments are described in the context of the following exemplary system and/or method.

Referring FIG. 1, wherein the system (100) is configured for autoencoder based multi-sensor fusion. It is to be noted that herein a single stage network that incorporates representation learning (utilizing autoencoders) to learn abstract data-driven discriminative representations from each sensor and combines/fuses their information for final inference making. This technique performs feature level fusion, where the input can be raw sensor data or domain specific hand-crafted features extracted from the different sensors (to enable data compression). As opposed to two stage network available in literature, this single stage network allows more discriminative features to be learnt from individual sensors, thereby resulting in a more efficient technique with superior performance compared to the state-of-art techniques.

Although the present disclosure is explained considering that the system (100) is implemented on a server, it may be understood that the system (100) may comprises one or more computing devices (102), such as a laptop computer, a desktop computer, a notebook, a workstation, a cloud-based computing environment and the like. It will be understood that the system (100) may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. The components and functionalities of the system (100) are described further in detail.

Figure 2:
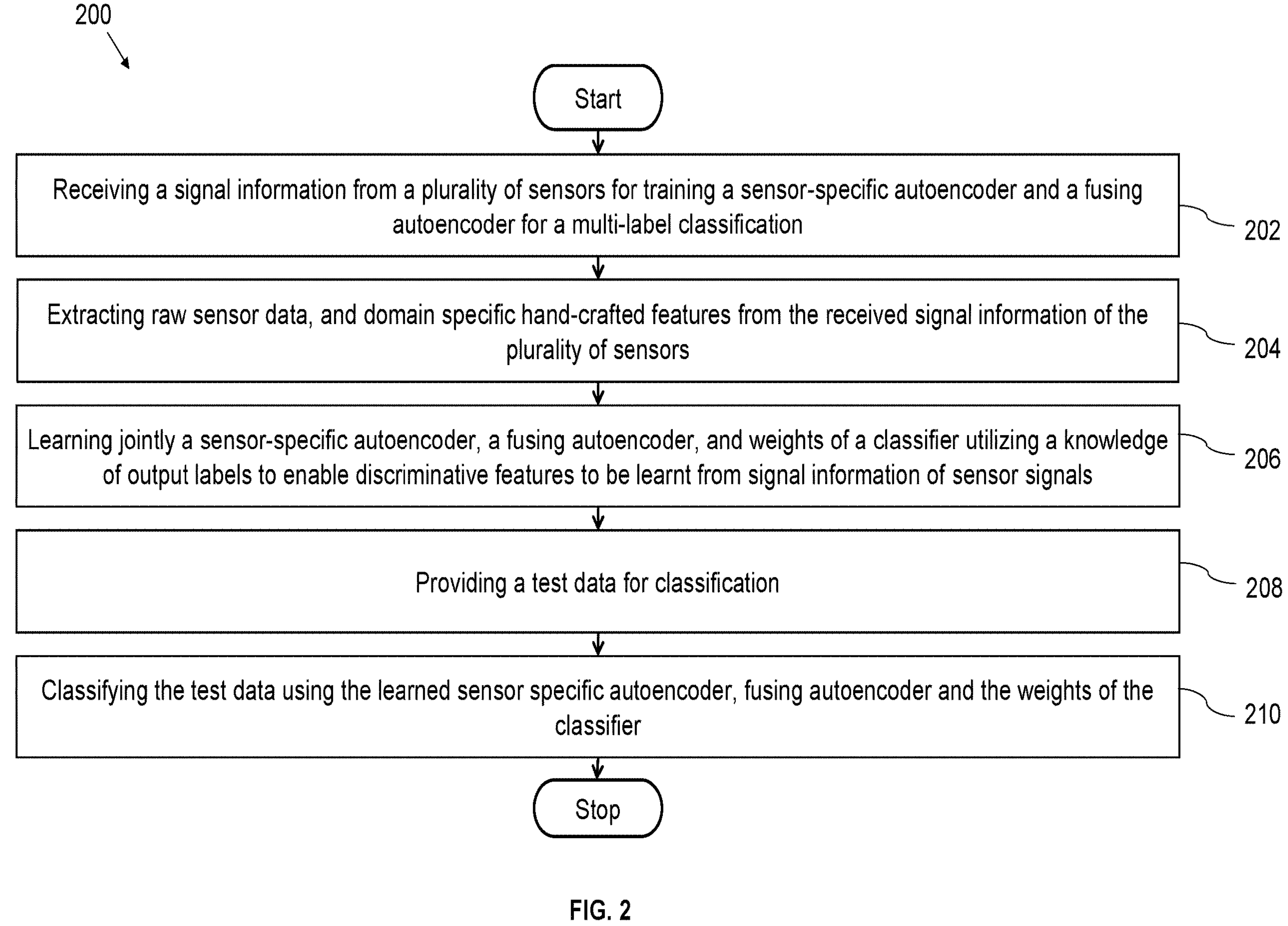
FIG. 2 is a high-level flow diagram of a method for auto-encoder based multi-sensor fusion, in accordance with some embodiments of the present disclosure.

Referring FIG. 2, a high-level flow diagram (200) of a method for autoencoder based multi-sensor fusion according to some embodiments of the present disclosure.

Figure 3:
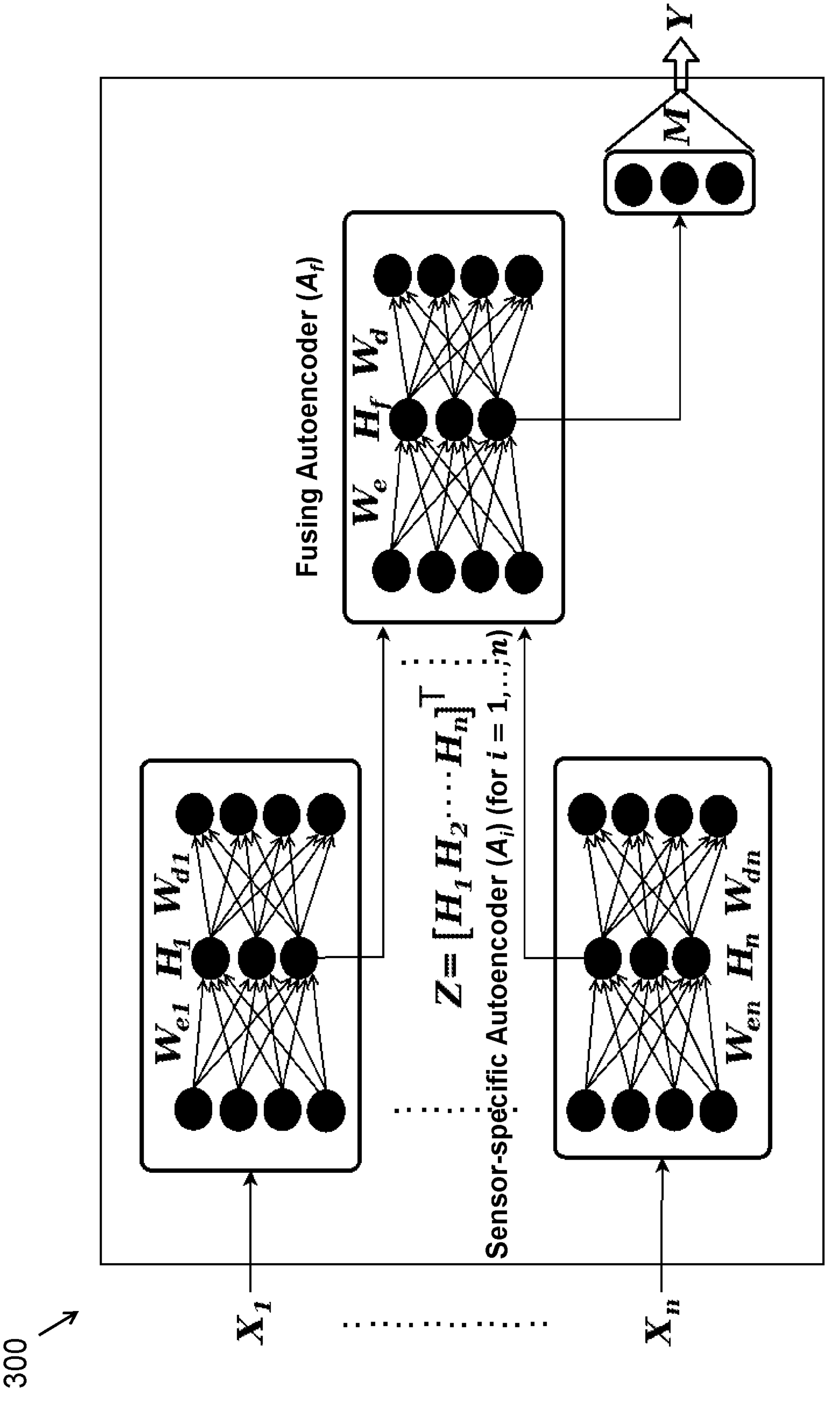
FIG. 3 is a schematic diagram to illustrate Fusion using Discriminative Autoencoder (F-DiAE) framework, in accordance with some embodiments of the present disclosure.

It would be appreciated that the discriminative autoencoder for building a single stage network for multi-sensor fusion has been used. Herein, the autoencoders are used to learn an identity function such that the output closely follows the input, in this process it learns abstract representation from the data. This framework makes use of discriminant autoencoders for fusing information from a plurality of sensors ($X_1, X_2 \ldots X_n$). Here, dedicated autoencoders are employed to learn high level abstract representations from each sensor. Subsequently, for classification, the latent representations from the plurality of sensors ($X_1, X_2 \ldots X_n$) are stacked together and given as input to fusing autoencoder whose latent representation are fed to a label consistent classifier. Thus, the framework performs multi-sensor fusion with discriminative autoencoder representations, and hence is termed as Fusion using Discriminative Autoencoder (F-DiAE) as shown in FIG. 3. A joint optimization is carried out to learn the sensor-specific representations and classifier weights together. It is to be noted that richer and more accurate representation of sensor data can be learnt using stacked autoencoders at the sensor side as shown in FIG. 3 for learning K-layer deep autoencoders at the sensor side.

Moreover, the F-DiAE framework makes use of a joint formulation, where the discriminative autoencoders and classifier are learnt together in the training phase, and later utilized in the test phase for performing fusion. In the training phase, a joint learning is carried out in which the sensor specific autoencoders, fusion autoencoder and classification weights (M) are learnt utilizing the knowledge of the output labels (Y). This configuration allows discriminative features to be learnt from each sensor, thereby exploiting the complementary information shared by them towards deriving the final inference.

Figure 4:
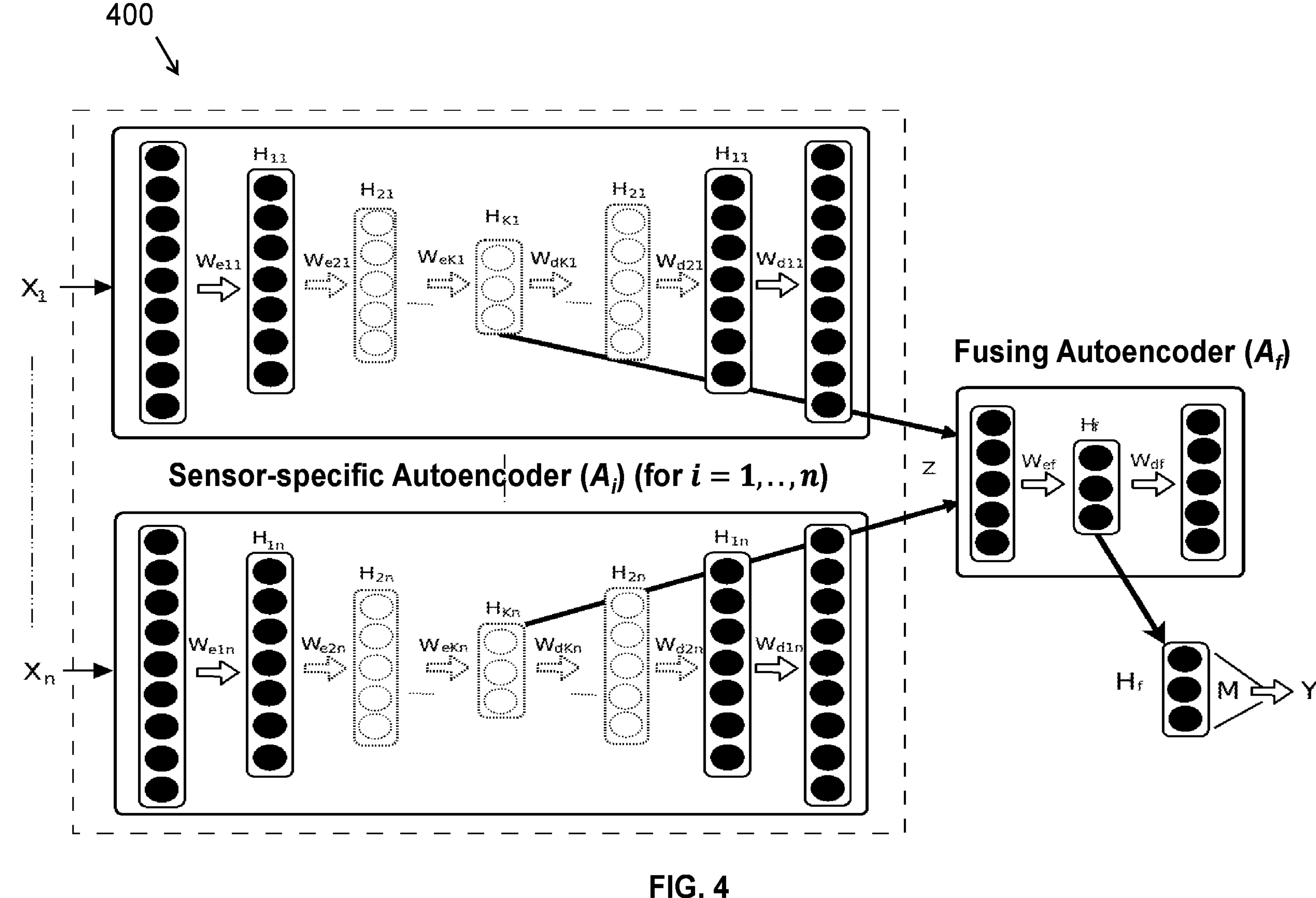
FIG. 4 is a schematic diagram to illustrate deep F-DiAE framework, in accordance with some embodiments of the present disclosure.

Referring FIG. 4, wherein for a network of a plurality of sensors ($X_1, X_2 \ldots X_n$), utilizing the augmented Lagrangian formulation for K-layer deep autoencoders at the sensor side, the joint optimization framework for F-DiAE is expressed as:

$$\min_{W_{e's}, W_{d's}, H's, W_{ef}, W_{df}, H_f, M} \|W_{e11}X_1 - H_{11}\|_F^2 + \|W_{e21}H_{11} - H_{21}\|_F^2 + \ldots + \|W_{eK1}H_{(K-1)1} - H_{K1}\|_F^2 + \|W_{d11}H_{11} - X_1\|_F^2 + \|W_{d21}H_{21} - H_{11}\|_F^2 + \ldots + \|W_{dK1}H_{K1} - H_{(K-1)1}\|_F^2 + \ldots + \|W_{e1n}X_n - H_{1n}\|_F^2 + \|W_{e2n}H_{1n} - H_{2n}\|_F^2 + \ldots + \|W_{eKn}H_{(K-1)n} - H_{Kn}\|_F^2 + \|W_{d1n}H_{1n} - X_n\|_F^2 + \|W_{d2n}H_{2n} - H_{1n}\|_F^2 + \ldots + \|W_{dKn}H_{Kn} - H_{(K-1)n}\|_F^2 + \|W_{ef}Z - H_f\|_F^2 + \|W_{df}H_f - Z\|_F^2 + \lambda\|Y - MH_f\|_F^2 \tag{1}$$

Such that all H's≥0, $H_f$≥0 and $$Z = \begin{bmatrix} H_{K1} \\ H_{K1} \\ \vdots \\ H_{Kn} \end{bmatrix}.$$

Figure 5:
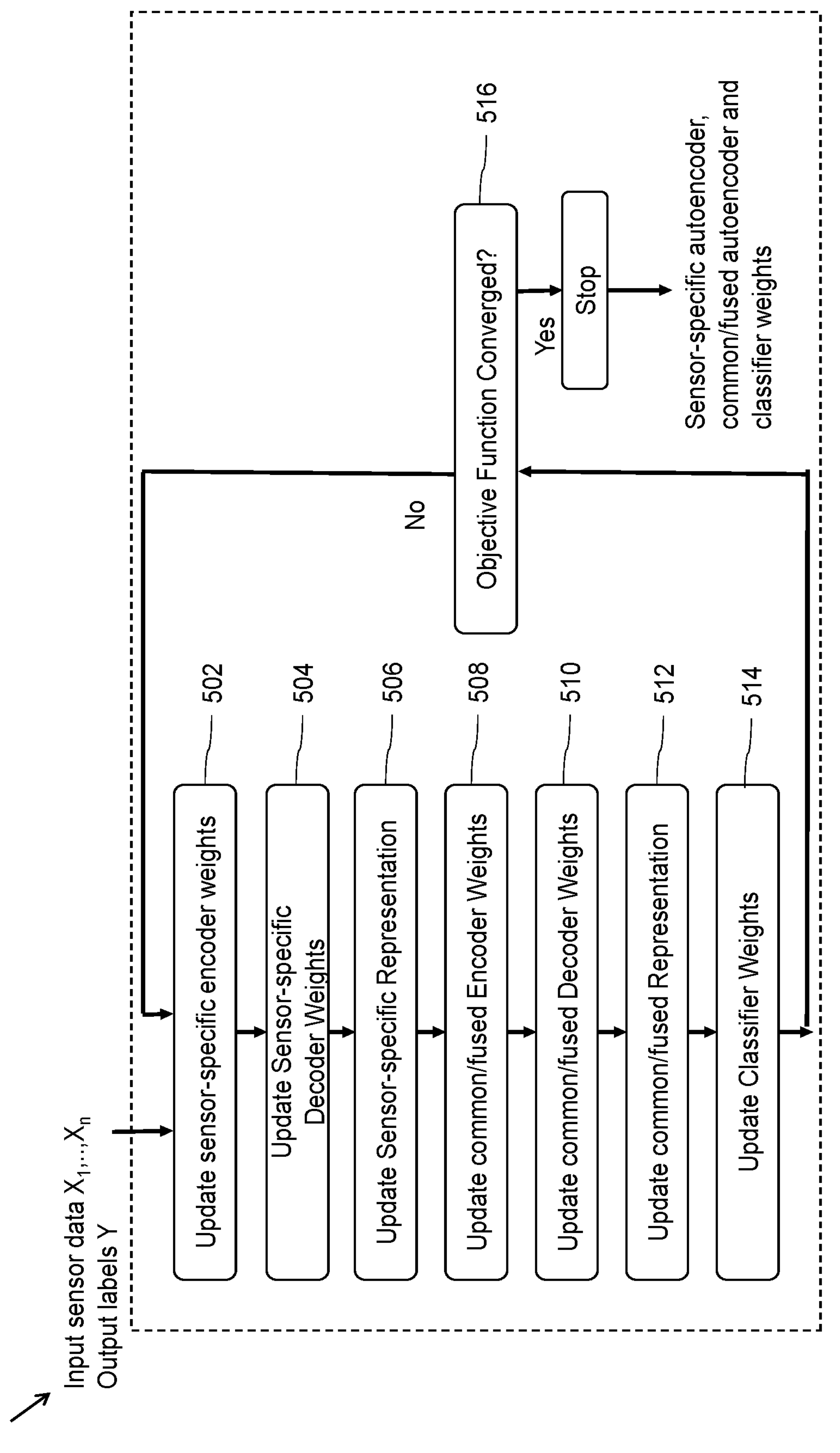
FIG. 5 is a functional block diagram to illustrate training phase of the autoencoder, in accordance with some embodiments of the present disclosure.

Referring FIG. 5, a functional block diagram (500) illustrating training phase of the sensor specific autoencoder, in accordance with some embodiments of the present disclosure. Herein, a Rectified Linear Unit (ReLU) type non-linearity is applied on the latent representation by enforcing the representations of each layer to be non-negative. The stacked autoencoders, ([$W_{e1n}$, $W_{d1n}$] to [$W_{eKn}$, $W_{dKn}$]) are used to learn deep representations from each of the plurality of sensors ($X_1, X_2 \ldots X_n$). These representations are treated as features and are fused together using a fused autoencoder ($W_{ef}$, $W_{df}$). The latent representations of the fused autoencoder ($A_f$) are mapped to a linear classifier to perform classification. The first few terms are associated with learning the K-layer deep sensor specific autoencoders. The last three terms are associated with the learning of the fusion autoencoder using the stacked input representations from the plurality of sensors ($X_1, X_2 \ldots X_n$) and the classifier weights (M). It would be appreciated that in this framework, both the encoder and decoder weights of the autoencoders are given equal importance and the hyperparameter associated with these terms is 1 and hence not explicitly shown.

For the $i^{th}$ sensor, (i=1, . . . , n), j-layer deep (j=1, . . . , K), sensor-specific autoencoders weights are learnt (502) & (504), the sub-problems to learn the encoder and decoder weights, and hidden representation are given below (506):

The sensor-specific encoder weights are learnt as (508):

$$W_{eji} \leftarrow \min_{W_{eji}} \|W_{eji}H_{(j-1)i} - H_{ji}\|_F^2 \text{ where, for } j = 1,\ H_{0i} = X_i \tag{2}$$

$$W_{eji} = H_{ji}(H_{(j-1)i})^{-1}$$

The sensor-specific decoders weights are learnt as (510):

$$W_{dji} \leftarrow \min_{W_{dji}} \|W_{dji}H_{ji} - H_{(j-1)i}\|_F^2 \tag{3}$$

$$W_{dji} = H_{(j-1)i}(H_{ji})^{-1}$$

For j=K−1, the sensor-specific latent representations for layers K=1 to K−1 are given as:

$$H_{ji} \leftarrow \min_{H_{ji}} \|W_{eji}H_{(j-1)i} - H_{ji}\|_F^2 + \|W_{e(j+1)i}H_{ji} - H_{(j+1)i}\|_F^2 + \|W_{dji}H_{ji} - H_{(j-1)i}\|_F^2 + \|W_{d(j+1)i}H_{(j+1)i} - H_{ji}\|_F^2 \tag{4}$$

$$H_{ji} = \left(W_{e(j+1)i}^T W_{e(j+1)i} + 2I + W_{dji}^T W_{dji}\right)^{-1} \cdot \left[W_{eji}H_{(j-1)i} + W_{dji}^T H_{(j-1)i} + W_{e(j+1)i}^T H_{(j+1)i} + W_{d(j+1)i}H_{(j+1)i}\right]$$

The latent representation of the last layer (K) is computed differently as it goes as input to the fused autoencoder, hence they are learnt using the following (512):

$$H_{Ki} \leftarrow \min_{H_{Ki}} \|W_{eKi}H_{(K-1)i} - H_{Ki}\|_F^2 + \|W_{ef}Z - H_f\|_F^2 + \|W_{dKi}H_{Ki} - H_{(K-1)i}\|_F^2 + \|W_{df}H_f - Z\|_F^2 \tag{5}$$

$$H_{Ki} = \left(W_{efi}^T W_{efi} + 2I + W_{dKi}^T W_{dKi}\right)^{-1} \cdot \left[W_{eKi}H_{(K-1)i} + W_{dKi}^T H_{(K-1)i} + W_{efi}^T\left(\sum_{a=1, a\neq i}^{n} W_{efa}H_{Ka} - H_f\right) + \left(\sum_{l=1}^{n} W_{dfl}\right)H_f - \sum_{a=1, a\neq i}^{n} H_{Ka}\right]$$

For the second stage, the common or fused encoder $W_{ef}$ and decoder $W_{df}$, they are learnt are updated using least square by solving the following:

$$W_{ef} \leftarrow \min_{W_{ef}} \|W_{ef}Z - H_f\|_F^2 \tag{6}$$

$$W_{ef} = H_f(Z)^{-1}$$

$$W_{df} \leftarrow \min_{W_{df}} \|W_{df}H_f - Z\|_F^2 \tag{7}$$

$$W_{df} = Z(H_f)^{-1}$$

$$\text{where, } Z = \begin{bmatrix} H_{K1} \\ H_{K2} \\ \vdots \\ H_{Kn} \end{bmatrix}$$

Let $W_{ef}$=[$W_{ef1}$, $W_{ef2}$, . . . , $W_{efn}$] and $$W_{df} = \begin{bmatrix} W_{df1} \\ W_{df2} \\ \vdots \\ W_{dfn} \end{bmatrix},$$

the closed form update for the fused representation, $H_f$ is computed as:

$$H_f \leftarrow \min_{H_f} \|W_{ef}Z - H_f\|_F^2 + \|W_{df}H_f - Z\|_F^2 + \lambda\|Y - MH_f\|_F^2 \quad (8)$$

$$H_f = \left(\lambda M^T M + I + W_{df}^T W_{df}\right)^{-1} \cdot \left[W_{ef}Z + W_{df}^T Z + \lambda M^T Y\right]$$

For the update of the classification weights, M(514):

$$M \leftarrow \min_{M} \|Y - MH_f\|_F^2 \quad (9)$$

$$M = Y(H_f)^{-1}$$

It is to be noted that the non-negativity constraints are not considered explicitly here. This would have required solving an iterative forward-backward algorithm which, in turn. Would make the solution more time consuming. Instead, an approximation is used whereby after solving for each latent representation, the negative values are set to 0. The network parameters of the F-DiAE framework are updated iteratively until the termination criteria is met after which the model is said to be learnt and the training stops (516). The learning termination criterion is one of (i) completion of a predefined number of iterations (Maxiter) and (ii) difference of the fusing autoencoder ($A_f$) of a current iteration and the fusing autoencoder ($A_f$) of a previous iteration being less than an empirically determined threshold value (Tol).

Figure 6:
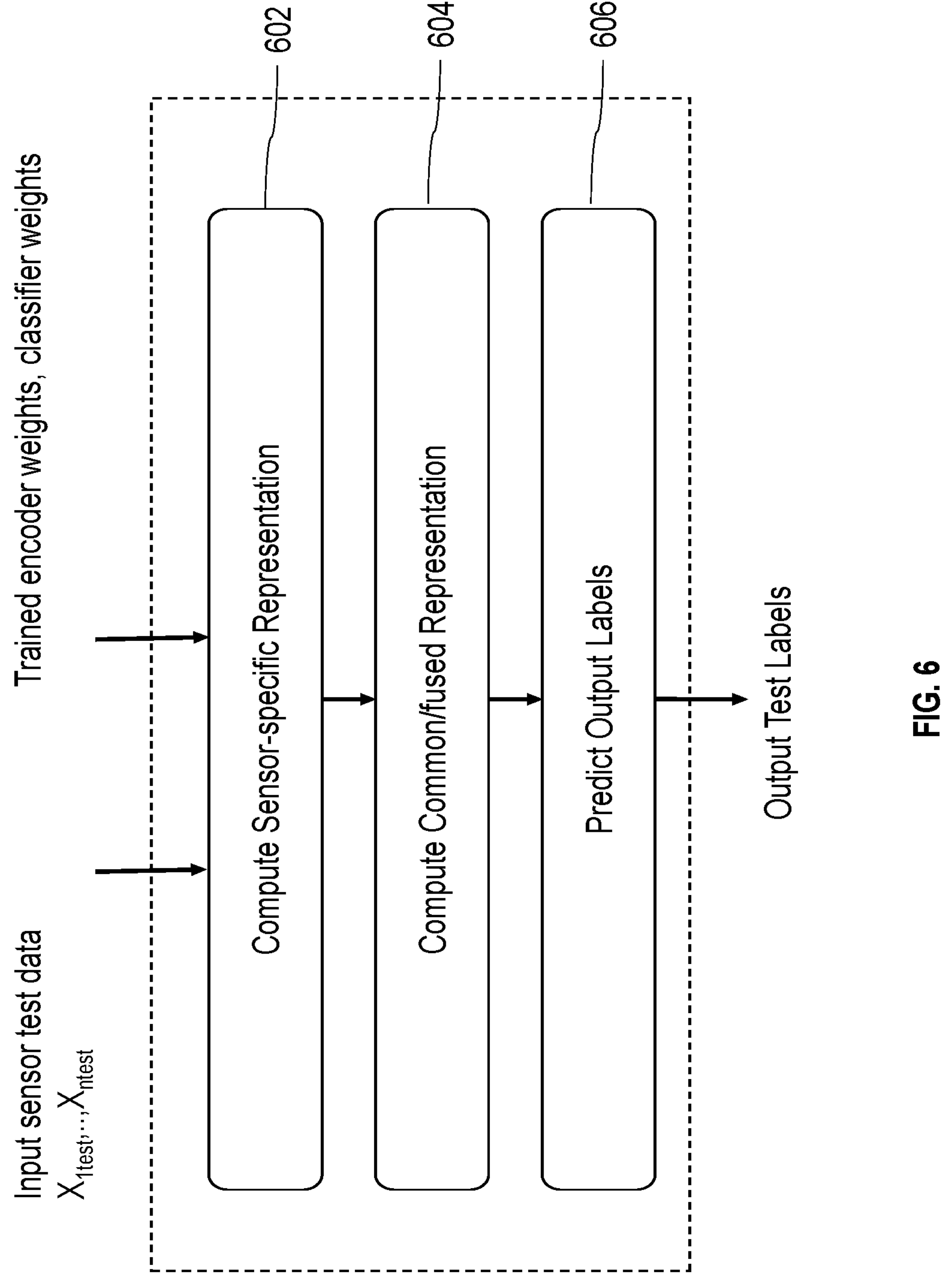
FIG. 6 is a functional block diagram to illustrate test phase of the autoencoder, in accordance with some embodiments of the present disclosure.
Figure 7:
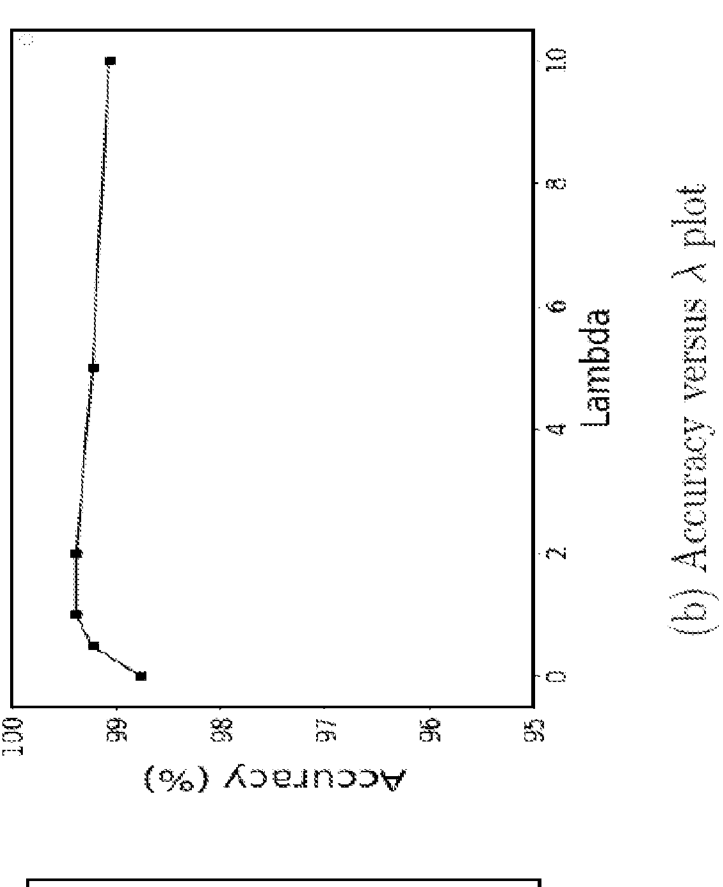
FIG. 7a-7b is a graphical representation to illustrate performance of F-DiAE for bearing fault detection, in accordance with some embodiments of the present disclosure.
Figure 7:
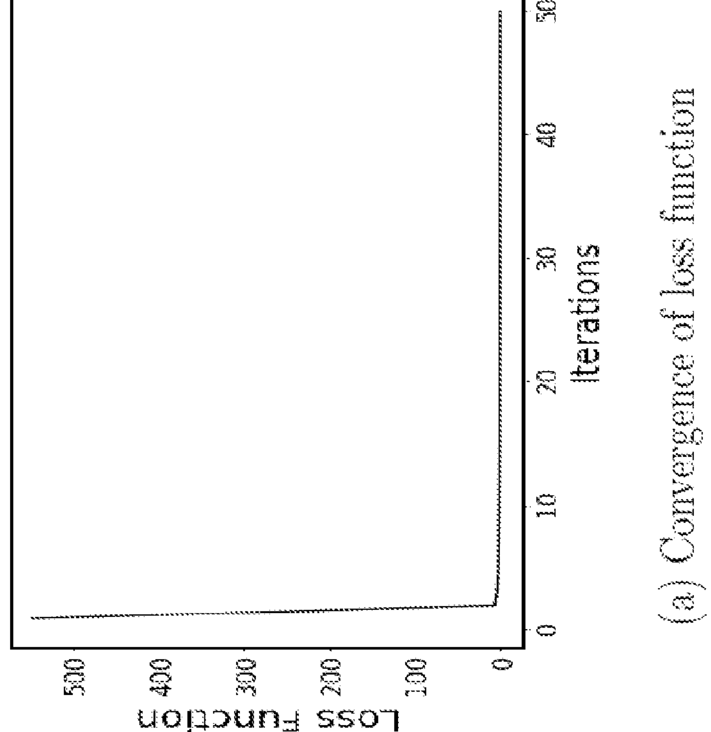
Figure 8:
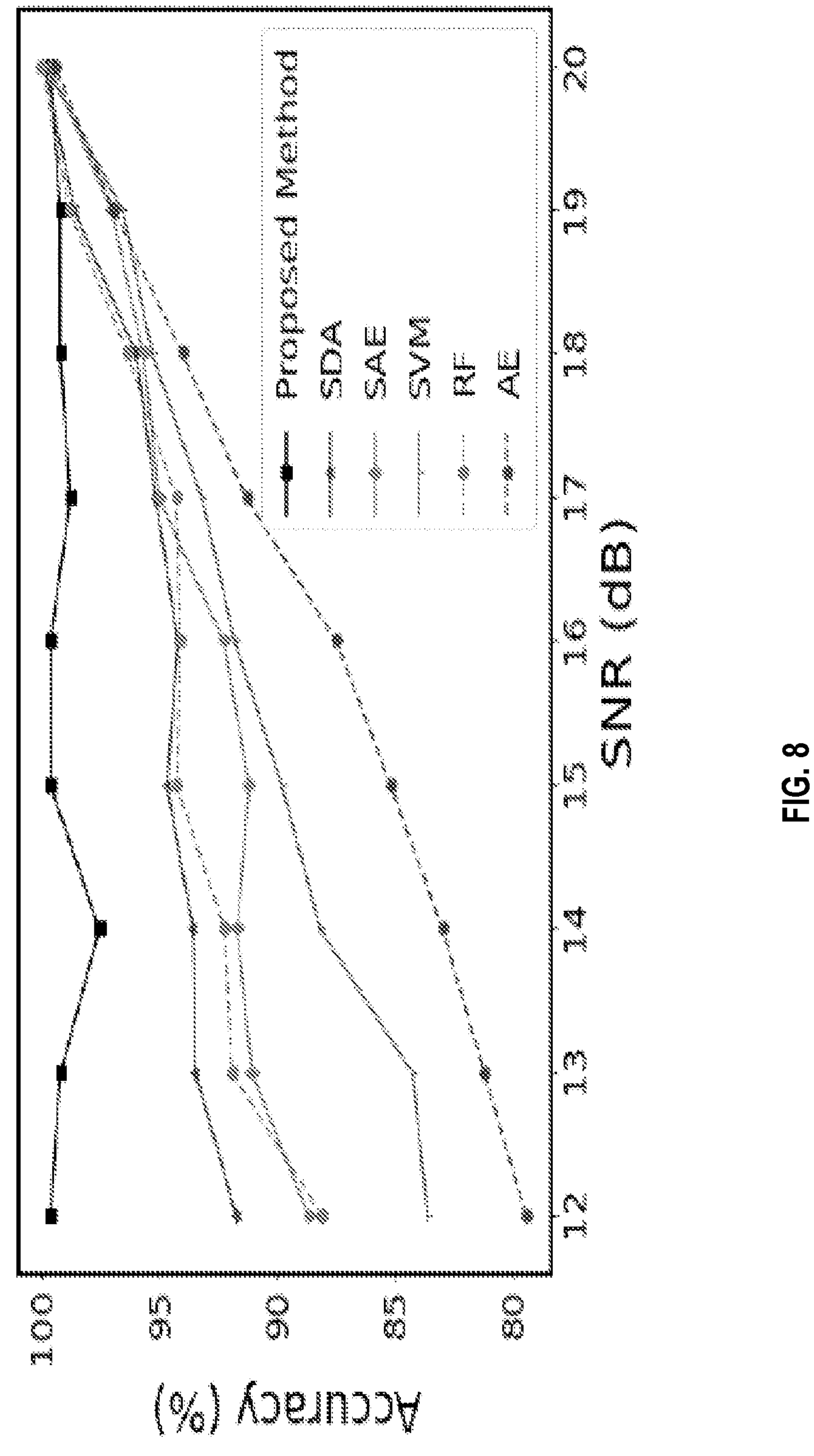
FIG. 8 is a graphical representation to illustrate performance of F-DiAE with additive white Gaussian noise (AWGN) at different SNRs, in accordance with some embodiments of the present disclosure.

Referring FIG. 6, a functional block diagram (600) to illustrate test phase of the autoencoder, in accordance with some embodiments of the present disclosure. Herein, for test data $$X_i^{test}$$

corresponding to the $i^{th}$ sensor, the latent representations $$H_{ji}^{test}$$

(for all j={1, 2, . . . , K}) and $$H_{Ki}^{test}$$

are obtained using the learnt weights $W_{e1i}, W_{e2i}, \ldots, W_{eKi}$. These can be expressed as:

$$H_{1i}^{test} = W_{e1i}X_i^{test} \text{ for } j = 1 \text{ and } H_{ji}^{test} = W_{eji}H_{(j-1)i}^{test} \quad (10)$$

$$(\text{for all } j = \{2, 3, \ldots, K\})$$

$$\text{Thus, } H_{Ki}^{test} = W_{eKi}W_{e(K-1)i}^{test} \ldots W_{e1i}^{test}X_i^{test}.$$

These representations are learnt for all i={1, 2, . . . , n} sensors. All sensor-specific representations are concatenated to get $Z^{test}$.

$$Z^{test} = [H_{K1}^{test}, H_{K2}^{test}, \ldots, H_{Kn}^{test}]^T \quad (11)$$

Finally, $Y^{test}$ is obtained as follows:

$$H_f^{test} = W_{ef}Z^{test} \quad (12)$$

$$Y^{test} = MH_f^{test} \quad (13)$$

In one example, wherein industrial machines for bearing fault detection and classification are provided. Herein, the F-DiAE employs a Max Pooling architecture at the output to determine the class label. The value of hyperparameter λ and hidden layer dimension of all the autoencoders of F-DiAE are tuned using grid search and optimal values are used to present the results.

The bearing data provided by the Case Western Reserve University (CWRU) Bearing Data Center is used for classifying normal and faulty bearings. The experimental setup includes a motor whose shaft is supported by bearings installed at the drive end and fan end of the motor. Faults of different diameters 7 mils, 14 mils and 21 mils are introduced each in the ball, inner race, and outer race of the bearings. Two accelerometers, mounted at the drive end and fan end of the motor respectively, are used to capture the vibration data at a sampling frequency of 12 kHz under four different loading conditions—0, 1, 2 and 3 hp. A 4-class classification is carried out to detect (i) inception faults (faults at its onset) and (ii) faults across all severity levels, at the ball, inner and outer race of the bearing. A sample duration of 500 milliseconds is considered for these two classification problems. For inception fault detection, faulty data corresponding to 7 mils diameter is only considered which amounts to 320 samples for all the 4 classes. For fault detection across all severity levels, faulty data corresponding to all fault diameters are considered which results in a total of 640 samples for classification.

Different time, frequency and time-frequency domain features are extracted from each data sample and fed to F-DiAE framework for classification. The time domain features include root mean square, variance, data peak, kurtosis, and peak to peak values. The frequency domain features include spectral skewness, kurtosis, and energy. Wavelet energy is used as the time-frequency feature. The performance of one-layer deep (K=1) F-DiAE and comparisons with the state-of-the-art methods averaged over 5-fold cross validation are presented in Table 1.

TABLE 1

| Method | Inception Faults (%) | All Faults (%) |
|---|---|---|
| SVM | 97.2 | — |
| KNN | 95.6 | — |
| MLP [20, 40] | 96.8 | — |
| SAE-DNN [20, 40] | 97.4 | — |
| RNN [20, 20] | 95.6 | — |
| GRU [20, 20] | 98.1 | — |
| BiGRU [20, 20] | 98.5 | — |
| LFGRU [20, 80] | 99.6 | — |
| ICDSVM | 100 | 97.75 |
| F-DiAE [10, 20] | 100 | 99.38 |

The network structure employed for the deep learning models are also mentioned in the Table 1. It can be seen that for inception faults, F-DiAE demonstrates superior performance with relatively simpler structure as compared to deep learning-based methods like BiGRU and LFGRU. For comparing the performance of fault detection across all severity levels, F-DiAE has better accuracy with simple features than the work that employs permutation entropy and intrinsic mode function-based features followed by optimized SVM for classification. FIG. 7*a*-7*b*) presents the performance characteristics of F-DiAE optimization framework (700) with (a) convergence plot and (b) accuracy versus plot for this dataset. The algorithm converges within a few iterations. It can be observed that the accuracy is not affected much for different $\lambda$ values.

Further, the performance of F-DiAE is also tested for noisy environments that emulate a real-life scenario. Additive White Gaussian Noise (AWGN) is introduced at different SNR levels, and the corresponding classification accuracies are computed. Similar to the work, 4-class classification for fault identification is carried out with noisy bearing signals for 0 loading condition. The accuracy obtained with the proposed algorithm in the presence of noise, averaged over 5 folds cross validation is presented in FIG. 8 along with other methods. The results exhibit the superior performance of F-DiAE for all SNR values, except at 20 dB where performance is comparable to other methods. This highlights the robustness and effectiveness of the proposed framework for classification that is achieved by fusing information from multiple sensors.

The embodiments of present disclosure herein address unresolved problem associated with multi-sensor fusion. Herein, embodiments of the disclosure provide a method and system for a discriminative autoencoder based architecture for multi-sensor fusion. The joint learning of the autoencoders and classifier weights allows discriminative and robust features to be learnt from sensor signals for more reliable inference making.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device, which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purpose of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for autoencoder based multi-sensor fusion for fault detection in industrial machines, the processor implemented method comprising steps of:

receiving, via an input/output interface, a signal information from a plurality of sensors ($X_1, X_2 \ldots X_n$) for training a sensor-specific autoencoder ($A_i$) (for i=1, . . . , n), and a fusing autoencoder ($A_f$) for a multi-label classification; extracting, via one or more hardware processors, raw sensor data, and domain specific hand crafted features from the received signal information of the plurality of sensors ($X_1, X_2 \ldots X_n$);

learning jointly, via the one or more hardware processors, the sensor-specific autoencoder ($A_i$), the fusing autoencoder ($A_f$), and weights (M) of a classifier utilizing a knowledge of output labels (Y) to enable discriminative features to be learnt from the signal information of each of the plurality of sensor signals ($X_1, X_2 \ldots X_n$), wherein the autoencoders learn abstract data-driven discriminative representations from each sensor by learning an identity function and combines learnt information for inference making, wherein the learning comprises:

learning the sensor-specific autoencoder ($A_i$) from the extracted raw sensor data, and domain specific hand crafted features to extract sensor specific latent representations ($H_i$), combining the extracted sensor specific latent representations ($H_i$) of the sensor specific autoencoder ($A_i$) corresponding to each of the plurality of sensors ($X_1, X_2 \ldots X_n$), learning the fusing autoencoder ($A_f$) based on the combined latent representations corresponding to each of the plurality of sensors ($X_1, X_2 \ldots X_n$), and learning weights (M) of the classifier utilizing a latent representation ($H_f$) of the fusing autoencoder ($A_f$) for a multi-label classification, wherein the sensor-specific autoencoder ($A_i$), the fusing autoencoder ($A_f$), and weights (M) of the classifier is updated iteratively till a termination criteria is met;

providing, via the one or more hardware processors, a test data comprising sensor data from the plurality of sensors for classifications; and classifying, via the one or more hardware processors, the test data using the learned sensor specific autoencoder ($A_i$), the fusing autoencoder ($A_f$) and the weights (M) of the classifier, wherein the latent representations of the fusing autoencoder ($A_F$) are mapped to a linear classifier to perform multi-label classification;

performing, a joint optimization to learn the sensor-specific latent representations and classifier weights together, wherein the joint optimization uses K-layer deep discriminative autoencoder network, expressed as:

$$\min_{W_{e's}, W_{d's}, H's, W_{ef}, W_{df}, H_f, M} \|W_{e11}X_1 - H_{11}\|_F^2 + \|W_{e21}H_{11} - H_{21}\|_F^2 + \ldots + \|W_{eK1}H_{(K-1)1} - H_{K1}\|_F^2 + \|W_{d11}H_{11} - X_1\|_F^2 + \|W_{d21}H_{21} - H_{11}\|_F^2 + \ldots + \|W_{dK1}H_{K1} - H_{(K-1)1}\|_F^2 + \ldots + \|W_{e1n}X_n - H_{1n}\|_F^2 + \|W_{e2n}H_{1n} - H_{2n}\|_F^2 + \ldots + \|W_{eKn}H_{(K-1)n} - H_{Kn}\|_F^2 + \|W_{d1n}H_{1n} - X_n\|_F^2 + \|W_{d2n}H_{2n} - H_{1n}\|_F^2 + \ldots + \|W_{dKn}H_{Kn} - H_{(K-1)n}\|_F^2 + \|W_{ef}Z - H_f\|_F^2 + \|W_{df}H_f - Z\|_F^2 + \lambda\|Y - MH_f\|_F^2$$

such that all H's≥0, $H_f \geq 0$ and $$Z = \begin{bmatrix} H_{K1} \\ H_{K2} \\ \vdots \\ H_{Kn} \end{bmatrix},$$

wherein ($[W_{e1n}, W_{d1n}]$ to $[W_{eKn}, W_{dKn}]$) are K-layer deep stacked autoencoders used to learn deep representations from each of the n sensors, wherein accurate representation of the sensor data is learnt using the K-layer deep stacked autoencoders, wherein the joint optimization is carried out to learn the sensor-specific latent representations ($H_i$), the fused latent representation ($H_f$) and the weights (M) of the classifier together, wherein the discriminative autoencoder network makes use of discriminative autoencoders, wherein discriminative autoencoders and classifier weights are learnt together in training phase, and further utilized in test phase for performing multi sensor fusion, wherein the joint learning of the autoencoders and classifier weights allows discriminative features to be learnt from sensor signals for accurate inference with reduced complexity; and utilizing the multi-label classification of the test data using the multi-sensor fusion for fault detection and fault classification in industrial machines.

2. The processor-implemented method of claim 1, wherein j-layer deep (j=1, . . . , K) sensor-specific encoders for $i^{th}$ sensor (i=1, . . . , n) are learnt as:

$$W_{eji} \leftarrow \min_{W_{eji}} \|W_{eji}H_{(j-1)i} - H_{ji}\|_F^2 \text{ where, for } j = 1, H_{0i} = X_i$$

$$Weji = H_{ji}(H_{(j-1)i})^{-1}.$$

3. The processor-implemented method of claim 1, wherein j-layer deep (j=1 . . . K) sensor-specific encoders for $i^{th}$ sensor (i=1, . . . , n) are learnt as:

$$W_{dji} \leftarrow \min_{W_{dji}} \|W_{dji}H_{ji} - H_{(j-1)i}\|_F^2 \text{ where, for } j = 1, H_{0i} = X_i$$

$$W_{dji} = H_{(j-1)i}(H_{ji})^{-1}.$$

4. The processor-implemented method of claim 1, wherein the sensor specific j-layer deep (j=1, . . . , K) latent representation ($H_i$) is learnt for the $i^{th}$ sensor (i=1, . . . , n) using j-layer deep sensor-specific autoencoders:

for j=1, . . . , K−1, the sensor-specific latent representations are given as—

$$H_{ji} = \left(W_{e(j+1)i}^T W_{e(j+1)i} + 2I + W_{dji}^T W_{dji}\right)^{-1} \cdot \left[W_{eji}H_{(j-1)i} + W_{dji}^T H_{(j-1)i} + W_{e(j+1)i}^T H_{(j+1)i} + W_{d(j+1)i}H_{(j+1)i}\right]$$

wherein, $H_{ji}$ is the j-layer deep latent representation of sensor $X_i$;

$W_{eji}$ is j-layer deep encoder weights of $A_i$;

$W_{dji}$ is j-layer deep decoder weights of $A_i$; and for j=K, the sensor-specific latent representations are given as—

$$H_{Ki} = \left(W_{efi}^T W_{efi} + 2I + W_{dKi}^T W_{dKi}\right)^{-1} \cdot \left[W_{eKi}H_{(K-1)i} + W_{dKi}^T H_{(K-1)i} - W_{efi}^T\left(\sum_{a=1, a\neq i}^{n} W_{efa}H_{Ka} - H_f\right) + \left(\sum_{l=1}^{n} W_{dfl}\right)H_f - \sum_{a=1, a\neq i}^{n} H_{Ka}\right]$$

wherein, $H_{ji}$ is the j-layer deep latent representation of sensor $X_i$;

$W_{ef}$ is encoder weights of $A_f$ $W_{df}$ is decoder weights of $A_f$.

5. The processor-implemented method of claim 1, wherein the fused latent representation ($H_f$) is computed as:

$$H_f = \left(\lambda M^T M + I + W_{df}^T W_{df}\right)^{-1} \cdot \left[W_{ef}Z + W_{df}^T Z + \lambda M^T Y\right]$$

wherein, $W_{ef}=[W_{ef1}, W_{ef2}, \ldots, W_{efn}]$ is encoder weights of $A_f$; and $$W_{df} = \begin{bmatrix} W_{df1} \\ W_{df2} \\ \vdots \\ W_{dfn} \end{bmatrix} \text{ is decoder weights of } A_f.$$

6. The processor-implemented method of claim 1, wherein the fused encoder ($W_{ef}$) and the fused decoder ($W_{df}$) are learnt and updated using a least square as follows:

$$W_{ef} = H_f(Z)^{-1}$$

$$W_{df} = Z(H_f)^{-1}$$

$$\text{where, } Z = \begin{bmatrix} H_{K1} \\ H_{K2} \\ \vdots \\ H_{Kn} \end{bmatrix}.$$

7. The processor-implemented method of claim 1, wherein updating the classification weights (M) as follows:

$M=Y(H_f)^{-1}$

8. The processor-implemented method of claim 1, wherein learning termination criterion is one of (i) completion of a predefined number of iterations (Maxiter) and (ii) difference of the fusing autoencoder ($A_f$) of a current iteration and the fusing autoencoder ($A_f$) of a previous iteration being less than an empirically determined threshold value.

9. The processor-implemented method of claim 1, wherein $$H_{Ki}^{test} = W_{eKi} W_{e(K-1)i}^{test} \ldots W_{e1i}^{test} X_i^{test}$$

wherein for test data $$X_i^{test}$$

corresponding to the $i^{th}$ sensor (i=1, . . . , n), the latent representations $$H_{ji}^{test}$$

(for all j={1, 2, . . . , K}) and $$H_{Ki}^{test}$$

are obtained using the learnt weights $W_{e1i}$, $W_{e2i}$, . . . , $E_{eKi}$;

$$H_{1i}^{test} = W_{e1i} X_i^{test} \text{ for } j = 1; \text{ and}$$

$$H_{ji}^{test} = W_{eji} H_{(j-1)i}^{test} \text{ (for all } j = \{2, 3, \ldots, K\}).$$

10. The method of claim 1, wherein the fault detection and fault classification comprises fault detection and classification pertaining to bearings, wherein the fault detection comprises at least one of one or more inception faults, one or more faults across plurality of severity levels, and wherein the one or more faults including faults at ball, and faults at inner and/or outer race of the bearing.

11. A system for autoencoder based multi-sensor fusion for fault detection in industrial machines, the system comprising:

an input/output interface (104) to receive signal information from a plurality of sensors ($X_1, X_2 \ldots X_n$) for training a sensor-specific autoencoder ($A_i$) (for i=1, . . . , n), and a fusing autoencoder ($A_f$) for a multi-label classification;

one or more hardware processors;

a memory in communication with the one or more hardware processors (108), wherein the one or more hardware processors (108) are configured to execute programmed instructions stored in the memory, to:

extract raw sensor data, and domain specific hand crafted features from the received signal information of the plurality of sensors ($X_1, X_2 \ldots X_n$);

learn jointly the sensor-specific autoencoder ($A_i$), the fusing autoencoder ($A_f$), and the weights (M) of a classifier utilizing a knowledge of output labels (Y) to enable discriminative features to be learnt from the signal information of each of the plurality of sensor signals ($X_1, X_2 \ldots X_n$), wherein the autoencoders learn abstract data-driven discriminative representations from each sensor by learning an identity function and combines learnt information for inference making, wherein the learning comprises:

learning the sensor-specific autoencoder ($A_i$) from the extracted raw sensor data, and the domain specific hand crafted features to extract sensor specific latent representations ($H_i$);

combining the extracted sensor specific latent representations ($H_i$) of the sensor specific autoencoder ($A_i$) corresponding to each of the plurality of sensors ($X_1, X_2 \ldots X_n$);

learning the fusing autoencoder (As) based on the combined latent representations corresponding to each of the plurality of sensors ($X_1, X_2 \ldots X_n$); and learning the weights (M) of the classifier utilizing a latent representation ($H_f$) of the fusing autoencoder ($A_f$) for a multi-label classification, wherein the sensor-specific autoencoder ($A_i$), the fusing autoencoder ($A_f$), and weights (M) of the classifier is updated iteratively till a termination criteria is met;

provide test data comprising sensor data from the plurality of sensors for classifications; and classify the test data using the learned sensor specific autoencoder ($A_i$), the fusing autoencoder ($A_f$) and the weights (M) of the classifier, wherein the latent representations of the fusing autoencoder ($A_f$) are mapped to a linear classifier to perform classification; performing, a joint optimization to learn the sensor-specific latent representations and classifier weights together, wherein the joint optimization uses K-layer deep discriminative autoencoder network, expressed as:

$$\min_{W_{e's}, W_{d's}, H's, W_{ef}, W_{df}, H_f, M} \|W_{e11}X_1 - H_{11}\|_F^2 + \|W_{e21}H_{11} - H_{21}\|_F^2 + \ldots +$$
$$\|W_{eK1}H_{(K-1)1} - H_{K1}\|_F^2 + \|W_{d11}H_{11} - X_1\|_F^2 + \|W_{d21}H_{21} - H_{11}\|_F^2 + \ldots +$$
$$\|W_{dK1}H_{K1} - H_{(K-1)1}\|_F^2 + \ldots + \|W_{e1n}X_n - H_{1n}\|_F^2 + \|W_{e2n}H_{1n} - H_{2n}\|_F^2 + \ldots +$$

-continued $$\|W_{eKn}H_{(K-1)n} - H_{Kn}\|_F^2 + \|W_{d1n}H_{1n} - X_n\|_F^2 + \|W_{d2n}H_{2n} - H_{1n}\|_F^2 + \ldots + \|W_{dKn}H_{Kn} - H_{(K-1)n}\|_F^2 + \|W_{ef}Z - H_f\|_F^2 + \|W_{df}H_f - Z\|_F^2 + \lambda\|Y - MH_f\|_F^2$$

such that all H's≥0, $H_f$≥0 and $$Z = \begin{bmatrix} H_{K1} \\ H_{K2} \\ \vdots \\ H_{Kn} \end{bmatrix},$$

wherein ([$W_{e1n}$, $W_{d1n}$] to [$W_{eKn}$, $W_{dKn}$]) are K-layer deep stacked autoencoders used to learn deep representations from each of the n sensors, wherein accurate representation of the sensor data is learnt using the K-layer deep stacked autoencoders, wherein the joint optimization is carried out to learn the sensor-specific latent representations ($H_i$), the fused latent representation ($H_f$) and the weights (M) of the classifier together, wherein the discriminative autoencoder network makes use of discriminative autoencoders, wherein discriminative autoencoders and classifier weights are learnt together in training phase, and further utilized in test phase for performing multi sensor fusion, wherein the joint learning of the autoencoders and classifier weights allows discriminative features to be learnt from sensor signals for accurate inference with reduced complexity; and utilize the multi-label classification of the test data using the multi-sensor fusion for fault detection and fault classification in industrial machines.

12. A non-transitory computer readable medium storing one or more instructions which when executed by one or more processors on a system, cause the one or more processors to perform a method comprising:

receiving, via an input/output interface, a signal information from a plurality of sensors ($X_1$, $X_2$ . . . $X_n$) for training a sensor-specific autoencoder ($A_i$) (for i=1, . . . , n), and a fusing autoencoder ($A_f$) for a multi-label classification;

extracting, via one or more hardware processors, raw sensor data, and domain specific hand crafted features from the received signal information of the plurality of sensors ($X_1$, $X_2$ . . . $X_n$);

learning jointly, via the one or more hardware processors, the sensor-specific autoencoder ($A_i$), the fusing autoencoder ($A_f$), and weights (M) of a classifier utilizing a knowledge of output labels (Y) to enable discriminative features to be learnt from the signal information of each of the plurality of sensor signals ($X_1$, $X_2$ . . . $X_n$), wherein the autoencoders learn abstract data-driven discriminative representations from each sensor by learning an identity function and combines learnt information for inference making, wherein the learning comprises:

learning the sensor-specific autoencoder ($A_i$) from the extracted raw sensor data, and domain specific hand crafted features to extract sensor specific latent representations ($H_i$);

combining the extracted sensor specific latent representations ($H_i$) of the sensor specific autoencoder ($A_i$) corresponding to each of the plurality of sensors ($X_1$, $X_2$ . . . $X_n$);

learning the fusing autoencoder ($A_f$) based on the combined latent representations corresponding to each of the plurality of sensors ($X_1$, $X_2$ . . . $X_n$); and learning weights (M) of the classifier utilizing a latent representation ($H_f$) of the fusing autoencoder ($A_f$) for a multi-label classification, wherein the sensor-specific autoencoder ($A_i$), a fusing autoencoder ($A_f$), and weights (M) of the classifier is updated iteratively till a termination criteria is met;

providing, via the one or more hardware processors, a test data comprising sensor data from the plurality of sensors for classifications; and classifying, via the one or more hardware processors, a test data using the learned sensor specific autoencoder ($A_i$), fusing autoencoder ($A_f$) and the weights of the classifier (M), wherein the latent representations of the fusing autoencoder ($A_F$) are mapped to a linear classifier to perform classification;

performing, a joint optimization to learn the sensor-specific latent representations and classifier weights together, wherein the joint optimization uses K-layer deep discriminative autoencoder network, expressed as:

$$\min_{W_{e's}, W_{d's}, H's, W_{ef}, W_{df}, H_f, M} \|W_{e11}X_1 - H_{11}\|_F^2 + \|W_{e21}H_{11} - H_{21}\|_F^2 + \ldots + \|W_{eK1}H_{(K-1)1} - H_{K1}\|_F^2 + \|W_{d11}H_{11} - X_1\|_F^2 + \|W_{d21}H_{21} - H_{11}\|_F^2 + \ldots + \|W_{dK1}H_{K1} - H_{(K-1)1}\|_F^2 + \ldots + \|W_{e1n}X_n - H_{1n}\|_F^2 + \|W_{e2n}H_{1n} - H_{2n}\|_F^2 + \ldots + \|W_{eKn}H_{(K-1)n} - H_{Kn}\|_F^2 + \|W_{d1n}H_{1n} - X_n\|_F^2 + \|W_{d2n}H_{2n} - H_{1n}\|_F^2 + \ldots + \|W_{dKn}H_{Kn} - H_{(K-1)n}\|_F^2 + \|W_{ef}Z - H_f\|_F^2 + \|W_{df}H_f - Z\|_F^2 + \lambda\|Y - MH_f\|_F^2$$

such that all H's≥0, $H_f$≥0 and $$Z = \begin{bmatrix} H_{K1} \\ H_{K2} \\ \vdots \\ H_{Kn} \end{bmatrix},$$

wherein ([$W_{e1n}$, $W_{d1n}$] to [$W_{eKn}$, $W_{dKn}$]) are K-layer deep stacked autoencoders used to learn deep representations from each of the n sensors, wherein accurate representation of the sensor data is learnt using the K-layer deep stacked autoencoders, wherein the joint optimization is carried out to learn the sensor-specific latent representations ($H_i$), the fused latent representation ($H_f$) and the weights (M) of the classifier together, wherein the discriminative autoencoder network makes use of discriminative autoencoders, wherein discriminative autoencoders and classifier weights are learnt together in training phase, and further utilized in test phase for performing multi sensor fusion, wherein the joint learning of the autoencoders and classifier weights allows discriminative features to be learnt from sensor signals for accurate inference with reduced complexity; and utilizing the multi-label classification of the test data using the multi-sensor fusion for fault detection and fault classification in industrial machines.

* * * * *